Figure 1:
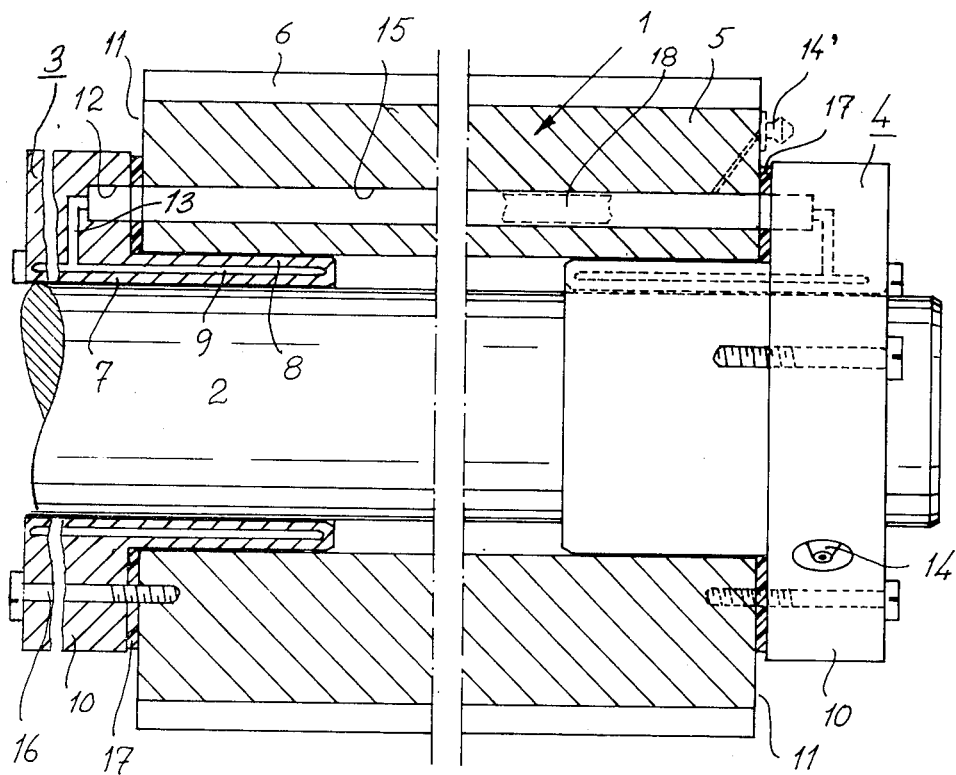

United States Patent [19]

Disborg

[11] 4,393,567
[45] Jul. 19, 1983

[54] METHOD AND APPARATUS FOR THE ASSEMBLY OF LONG OBJECTS ON A ROTATING SHAFT

[75] Inventor: Lennart Disborg, Linköping, Sweden

[73] Assignee: FFV Industriprodukter AB, Eskilstuna, Sweden

[21] Appl. No.: 302,276

[22] Filed: Sep. 15, 1981

[30] Foreign Application Priority Data

Oct. 17, 1980 [SE] Sweden .............................. 8007313

[51] Int. Cl.³ .................... B23P 17/00; B23P 11/02; F16D 19/00
[52] U.S. Cl. ............................ 29/421 R; 192/88 B; 29/446
[58] Field of Search ....... 29/113 AD, 116 AD, 426.6, 29/446, 421 R; 403/370; 308/9, 26; 277/34.3; 192/88 B

[56] References Cited

U.S. PATENT DOCUMENTS

| | | | |
|---|---|---|---|
| 2,583,117 | 1/1952 | Piperoux | 192/88 B |
| 2,673,573 | 3/1954 | Fawick | 192/88 B |
| 3,023,995 | 3/1962 | Hopkins | 192/88 B |
| 3,035,331 | 5/1962 | Wieman | 29/451 |
| 3,092,231 | 6/1963 | Kneuss | 192/88 B |
| 3,633,493 | 1/1972 | Helminen | 29/113 AD |
| 3,722,895 | 3/1973 | Mevisson | 277/34.3 |
| 4,093,052 | 6/1978 | Falk | 192/88 B |
| 4,194,746 | 3/1980 | Stevens | 277/34.3 |
| 4,252,328 | 2/1981 | Raj et al. | 277/34.3 |
| 8,861,815 | 1/1975 | Landaeus | 403/370 |

FOREIGN PATENT DOCUMENTS 2403337 8/1974 Fed. Rep. of Germany .... 192/88 B
569773 11/1957 Italy ....................................... 29/421

Primary Examiner—Ervin M. Combs
Assistant Examiner—Steven E. Nichols
Attorney, Agent, or Firm—James Creighton Wray

[57] ABSTRACT

A method and apparatus for the assembly of long objects (1) such as rollers, cylinders, elongated tools, for example surface cutters, on a rotating shaft (2) with the aid of two expander bushings (3, 4), each an integral part made up of an inner wall (7) and an outer wall (8), which between them form a pressure cavity (9), which is filled with a liquid or plastic pressure medium, and where the expander bushings (3, 4) each have a flange (10) arranged to contact each end surface (11) of the long object (1) which shall be assembled. An axial hole (12) is partially drilled in the expander bushing's flange (10) from the surface turned toward the expander bushing (7, 8), and the axial hole (12) is connected via a channel (13) to the pressure cavity (9) and a corresponding axial hole (15) is led through the long object (1), whereafter the expander bushings (3, 4) are axially fastened against the long object (1), so that the expander bushings (3, 4) and the long object (1) form a hydraulically sealed complete system, wherein pressure can be applied from either of the expander bushings, or from one or several nipples on the elongated object (1).

14 Claims, 2 Drawing Figures

METHOD AND APPARATUS FOR THE ASSEMBLY OF LONG OBJECTS ON A ROTATING SHAFT

The present invention concerns a method and an apparatus for the assembly of long objects on a rotating shaft. The invention concerns specifically a method of assembly with the aid of so called expander bushings made up of a sealed collar with an outer wall and an inner wall and a pressure medium between these two walls, upon which a pressure can be applied, whereby the collars outer and inner walls become deformed in a radial direction both outwards and inwards, so that the elongated object clamps to the rotating shaft. Expander bushings of this type are known for example through the American patent U.S. Pat. No. 3,861,815. Such expander bushings are most suitable for the assembly of certain objects such as gear wheels, pulleys, certain types of tools etc., on a rotating shaft. The assembly of long objects for example rollers, cylinders, roller rings, long tools such as surface cutters, long grinding wheels etc. however, are often the cause of economic and practical problems. In order to assemble such long objects with a single expander bushing, means that the bushing must be made at least as long as the object which is to be assembled. Long expander bushings are expensive and rather complicated to manufacture, problems can arise with a complete filling of the pressure medium in the cavity between the inner and outer walls of the expander collar. Depending on where and how pressure is applied to the pressure medium, an uneven pressure can be the result, so that the expander bushing in the one end receives a higher pressure and thereby greater deformation than in the other end, causing an unsatisfactory assembly of the long object.

In many cases it can be enough or even preferable that the assembly of the elongated object is made by a relatively short expander bushing in each end of the elongated object. When pressurizing the expander bushings a substantial bond is established at both ends of the long object and the possibility of uneven pressure and stress at the ends of the object is eliminated. In many cases the rotating shaft and/or the long object which shall be assembled on the rotating shaft is positioned or formed in such a way that it is difficult or impossible to reach the expander bushings for pressurising of them. In such cases it is not possible to utilize the advantage gained by two relatively short expander bushings at each end.

The aim of the present invention is to eliminate this inconveniance and to create a method and an apparatus for the assembly of long objects on a rotating shaft by using two relatively short expander bushings at each end of the shaft. According to the invention both expander bushings are formed with a flange which lies against each end surface of the elongated object, and in each flange an axial hole is drilled which is connected by a channel to the pressure cavity between the inner and outer walls of the collar. The elongated object is formed with an axial hole connecting the two axial holes in flanges of the expander bushings. The expander bushings are pre-assembled and sealed against the ends of the elongated object with the axial holes in the flanges of the expander bushings in line with the axial hole in the elongated object and under sealed conditions. This arrangement has the advantage that both expander bushings can be pressurized simultaneously from one of the expander bushings as the pressure is communicated through the axial hole to the opposite expander bushing.

The following will describe the invention in more detail using references to the accompanying drawings.

FIG. 1 on the drawings show a partial axial section through an apparatus where the function of the invention is utilized.

Figure 2:
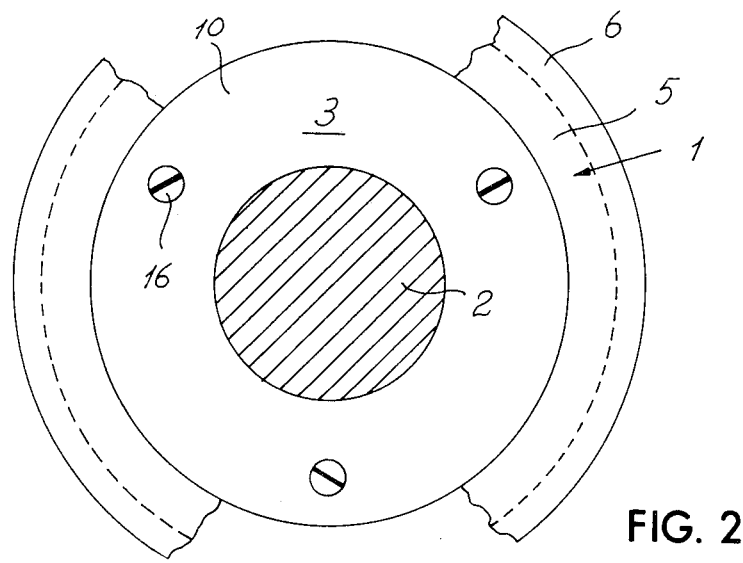

FIG. 2 shows the apparatus according to FIG. 1 in an end view seen from the left.

The drawings show therefore, a method for the assembly of an elongated rotating object, for example a cylinder, a roller, a surface cutter 1 or similar object on a rotating shaft 2. The assembly uses two expander bushings 3 and 4, which are assembled at each end of the surface cutter 1.

A special advantage is gained by the invention due to the fact that a hub of aluminium 5 can be used in conjunction with an outer cutting or grinding cylinder 6 of a harder material. As the major part of the tool is made up of aluminium, a relatively low price and in particular a low moment of inertia is achieved.

Each expander bushing 3 comprises a sealed collar with an inner wall 7 and an outer wall 8, which form between them a pressure cavity 9, which is filled with a pressure medium such as oil, grease or other medium. The one end of the expander bushing is formed with a flange 10, arranged to lie against the end surface 11 of the surface cutter 1 or its hub 5. On the surface facing the collar, the flange 10 is furnished with an axial hole 12 drilled only partially into the flange, and connects by a channel 13 to the pressure cavity 9, and is also filled with the pressure medium.

A principle intention with the invention is to create a construction where two expander bushings are connected with each other and can be pressurised from one or the other. Pressurising of the pressure cavity 9 can be made by known elements, for example, a pressure nipple to which a pressurizing tool can be applied, so that the pressure medium in the pressure cavity 9 is set under pressure, whereby the inner wall 7 is deformed radially inwards and the outer wall 8 is deformed radially outwards, causing the tool 1 to be tightened onto the rotating shaft 2.

Cooperation between the expander bushings 3 and 4 is effected by an axial hole 15 through the tool or through its hub 5, and connects with hole 12 in the expander bushing flanges 10. Both expander bushings 3 and 4 are preassembled against each end-surface 11 of the tool or the hub of the tool 5 by a number of screws 6, which are pulled through the flange 10 and threaded into the hub 5. Satisfactory sealing is arranged by the packing 17 between the flange 10 and the hubs end surface 11. The packing 17 is shaped in such a way as to have a hole corresponding to the flange's hole 12 and the hub's hole 15. The packing 17 can also be formed as a washer which seals only around the hole 12, 15. To form an even plane between the expander bushing and the elongated object, washers of even thickness can be positioned around each screw 16. It is important to note that even hole 15 is filled with a pressure medium or other force conveying elements. For example hole 15 can contain one or several filling elements 18, which are movable in the hub's hole 15 thereby reducing the amount of necessary pressure medium.

The tool 1 with the expander bushings 3 and 4 now comprises a complete unit, and when the expander bushings 3 and 4 are unpressurized the unit can be drawn onto the rotating shaft 2 and in the required axial position be tightened onto the shaft by applying a pressure tool to the nipple 14 in one or the other of the expander bushings. Thus, the pressure medium in both the bushings, pressure cavities 9 and the channels 13 together with the axial holes 12 and 15 is set under pressure. When changing the elongated object 1 the pressure is released from the pressure cavity 9 and the object together with the bushings can be easily drawn from the shaft 2 and be replaced by another object.

It will be obvious for an expert in the field that the expander bushings 3 and 4 can be formed as an integral part of the elongated object, or that the bushings can be fastened in the elongated object, or that the bushings can be fastened in anothe way than with the described screws. As the expander bushing 3 and 4 are identical, pressurizing can be effected from either of them, and the unit of object or tool 1 with the expander bushings 3 and 4 are symmetrical and reversable. The length of the expander bushing's collar 7, 8 can be chosen to suit each situation and be correctly proportioned to the object 1, which is to be assembled on the shaft, so that a satisfactory bond relative to the moment of the object 1 on the shaft tool 2 is achieved.

It is understood that the above description and the examples shown on the drawings are of an informative character only and that many different modifications can exist within the frame of of the following patent claims.

I claim:

1. Method for the assembly of long objects on a rotating shaft by using two expander bushings of the kind made up of a sealed body with an inner collar and an outer collar which form a pressure cavity between them filled with a pressure medium, and which has a means for pressurizing the pressure medium in the pressure cavity, and where the expander bushings each have a flange arranged to lie against each end surface of the long object which shall be assembled, characterized by that an axial hole is recessed partially into the flange of each expander bushing from the surface directed towards the collars, the hole being connected to a channel leading to the pressure cavity, and a corresponding axial hole is led through the long object which shall be assembled, and the expander bushings are first assembled to the end surfaces of the long object so that the expander bushings axial hole coincides with the axial hole through the long object, the axial holes and channels being filled with the same pressure medium as in the pressure cavity, whereby a hydraulic system is established between the unit comprising the expander bushings and the long object which shall be assembled.

2. Method according to claim 1, characterized in that a packing, applied between the respective expander bushings flange and surface of the long object which shall be assembled has an axial hole coinciding with the expander bushings and the long object's axial holes, the expander bushings being firmly attached to the end surface of the long object and sealed by the packings.

3. Method according to claims 1 or 2 characterized by that the expander bushings are firmly attached to the long object by using screws axially through the flanges of each respective expander bushing.

4. An apparatus to accomplish the method described in claim 1, for assembling long objects on a rotating shaft by using two expander bushings formed as a sealed body with an inner collar and an outer collar, which between them form a pressure cavity filled with a liquid or plastic pressure medium, and where the expander bushings have a flange arranged to lie against each end surface of the elongated object, which shall be assembled on the rotating shaft, characterized by that a hole is partially recessed into the flange of each expander bushing and which hole via a channel connects to pressure cavity, and that the hole is arranged to cooperate with a corresponding hole through the long object and with an equivalent hole in the opposite expander bushing, so that a hydraulic system is established between both the expander bushings and through the long object.

5. Apparatus according to claim 4, characterized by that both expander bushings and the long object form a single integrated unit, wherein the hydraulic system is sealed and can be pressurized from either of the expander bushings.

6. Apparatus according to claim 4, characterized by that both expander bushings and the long object form an integrated unit, wherein the hydraulic system is sealed and can be pressurized through a nipple situated in the elongated object.

7. Apparatus according to claim 4, characterized by that the expander bushings are attached to each end surface of the long object by using screws passing axially through the expander bushing's flange or by some similar method of axial attachment.

8. Apparatus according to claim 4, characterized by that a packing is positioned between the expander bushing's flange and the long objects end surface having an axial hole corresponding to the flanges and the long object's axial holes.

9. Method of mounting long cylindrical objects on a rotatable shaft the diameter of which is less than the inner diameter of a bore through the cylindrical object by using two mirror-symmetrical expander bushings of the kind having a sealed body, an inner sleeve and an outer sleeve, and a pressure cavity between said sleeves, which cavity is filled with a pressure medium, and means for pressurizing said pressure medium in the pressure cavity and wherein each expander bushing has a radial flange, comprising each expander bushing being formed with one or more axial holes extending from the surface of the radial flange facing the sleeves of the sealed body and being in communication with the pressure cavity, providing an axial passageway through the cylindrical object, mounting the two expander bushings mirror-symmetrically on the rotatable shaft with the sleeves in the bore of the cylindrical object and with the flanges of the expander bushings in sealed engagement with the end surfaces of the cylindrical object and with the holes in said flanges in alignment and sealed communication with the axial passageway through the cylindrical object, filling the pressure cavities, the axial holes and the axial passageway with the same pressure fluid, and pressurizing the said pressure fluid from any point of the pressure fluid system, whereby the pressure fluid establishes an expansion radially inwards of the inner sleeves and an expansion radially outwards of the outer sleeves to interconnect the cylindrical object and the rotatable shaft.

10. Method according to claim 9 wherein a gasket is provided between each end surface of the cylindrical object and the respective axial flange, and wherein the expander bushings are firmly attached to the cylindrical object by means of screw connections extending axially through the flanges of each respective expander bushing.

11. Apparatus for executing the method according to claim 9 for mounting of long cylindrical objects on a rotatable shaft by using two separate expander bushings formed as sealed bodies with an inner sleeve and an outer sleeve and a pressure cavity between the inner and outer sleeves which is filled with a liquid or plastic pressure medium, and in which each expander bushing has a radial flange adapted to sealingly engage an end surface of the cylindrical object to be mounted on the rotatable shaft, comprising the flange of each expander bushing being provided with one or more bores extending partially through the flange from the surface thereof facing the inner and outer sleeves and via a channel being in a fluid communication with the pressure cavity, and in which the cylindrical object is formed with one or more axial passageways which in size and location correspond to the bores in the expander bushing flanges, and in which the two expander bushings are adapted for mounting on the rotatable shaft with the sleeves extending into the cylindrical object and with the flanges sealingly engaging the end surfaces of said cylindrical object with the bores of the flanges in fluid communication with each other and in which the pressure cavities, the channels, the bores and the axial passageways are filled with the same pressure medium, and in which at least one of the expander bushings has means for pressurizing the pressure medium to provide an expansion radially inwards of the inner sleeves and radially outwards of the outer sleeves to interconnect the cylindrical object with the rotatable shaft.

12. Apparatus according to claim 11 wherein the expander bushings and the cylindrical object form a single integral unit and the pressure medium of the entire hydraulic system can be pressurized from either of the expander bushings.

13. Apparatus according to claim 11 wherein means for pressurizing the entire hydraulic system comprises a pressure nipple mounted in the cylindrical object in fluid communication with the axial passageway thereof.

14. Apparatus of claim 11 wherein the expander bushings are mounted by means of screws to the end surfaces of the cylindrical object over an intermediate gasket.

* * * * *